US012812442B2

(12) United States Patent
Sudhakaran et al.

(10) Patent No.: US 12,812,442 B2
(45) Date of Patent: Nov. 24, 2026

(54) ALIGNMENT OF PACKET TRANSMISSION TIME WITH THE RADIO RESOURCE AVAILABILITY IN A WIRELESS NETWORK

(71) Applicant: Intel Products IP LLC, Santa Clara, CA (US)

(72) Inventors: Susruth Sudhakaran, Beaverton, OR (US); Dave A. Cavalcanti, Portland, OR (US); Dibakar Das, Hillsboro, OR (US); Javier Perez-Ramirez, North Plains, OR (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/196,777

(22) Filed: May 12, 2023

(65) Prior Publication Data

US 2023/0284073 A1 Sep. 7, 2023

(51) Int. Cl.
*G06F 15/16* (2006.01)
*H04L 47/2408* (2022.01)
*H04W 28/02* (2009.01)

(52) U.S. Cl.
CPC ..... *H04W 28/0231* (2013.01); *H04L 47/2408* (2013.01)

(58) Field of Classification Search
CPC ....................... H04L 47/2408; H04W 28/0231
USPC .......................................................... 709/238
See application file for complete search history.

(56) References Cited

U.S. PATENT DOCUMENTS

| | | | | |
|---|---|---|---|---|
| 7,349,405 | B2 * | 3/2008 | Deforche | H04L 47/527 370/468 |
| 7,958,260 | B2 * | 6/2011 | Cloonan | H04L 47/2433 370/395.42 |
| 9,674,095 | B2 * | 6/2017 | Tsuruoka | H04L 47/27 |
| 10,454,835 | B2 * | 10/2019 | Contavalli | H04L 47/22 |
| 10,616,743 | B2 * | 4/2020 | Wojcieszak | H04W 4/80 |
| 10,674,450 | B2 * | 6/2020 | Yang | H04W 52/0229 |
| 10,922,185 | B2 * | 2/2021 | Chandra | G06F 11/1451 |
| 10,944,676 | B2 * | 3/2021 | Moussa | H04L 47/24 |
| 11,650,884 | B2 * | 5/2023 | Chandra | G06F 11/1451 714/49 |
| 12,413,532 | B2 * | 9/2025 | Sawabe | H04L 47/50 |
| 12,598,115 | B2 * | 4/2026 | Sze | H04L 41/5012 |

(Continued)

*Primary Examiner* — Moustafa M Meky
(74) *Attorney, Agent, or Firm* — Schwegman Lundberg & Woessner, P.A.

(57) ABSTRACT

An apparatus of a station (STA) includes memory and processing circuitry coupled to the memory. The processing circuitry is to decode an MSDU received at a MAC layer of the STA, the MSDU including a data packet and descriptor metadata. A DSCP tag and launch time information are detected in the descriptor metadata. The launch time information indicates a desired transmission time of the data packet. The data packet is placed in a first transmission queue of a plurality of transmission queues of the MAC layer based on the DSCP tag. A scheduled transmission time of at least a second transmission queue of the plurality of transmission queues is determined to conflict with the desired transmission time. The scheduled transmission time is adjusted based on the launch time information. The data packet is encoded for transmission by the desired transmission time using a wireless communication channel.

20 Claims, 10 Drawing Sheets

(56) References Cited

U.S. PATENT DOCUMENTS

| | | | | |
|---|---|---|---|---|
| 2003/0103497 | A1* | 6/2003 | Speight | H04L 47/50 370/355 |
| 2015/0009826 | A1* | 1/2015 | Ma | H04W 28/0268 370/235 |
| 2018/0279224 | A1* | 9/2018 | Yang | H04W 52/028 |
| 2019/0173792 | A1* | 6/2019 | Moussa | H04L 47/24 |
| 2019/0387382 | A1* | 12/2019 | Wojcieszak | H04W 4/80 |
| 2022/0269569 | A1* | 8/2022 | Chandra | G06F 11/1451 |
| 2023/0239702 | A1* | 7/2023 | Marina | H04W 16/14 370/329 |
| 2025/0030642 | A1* | 1/2025 | Sawabe | H04L 47/52 |

* cited by examiner

ALIGNMENT OF PACKET TRANSMISSION TIME WITH THE RADIO RESOURCE AVAILABILITY IN A WIRELESS NETWORK

TECHNICAL FIELD

Embodiments pertain to wireless networks and wireless communications. Some embodiments relate to wireless local area networks (WLANs) and Wi-Fi networks including networks operating under the IEEE 802.11 family of standards. Some embodiments relate to improving the alignment of packet transmission time with the radio resource availability in a wireless network.

BACKGROUND

Many distributed time-sensitive applications (e.g. robotics, industry automation, and extended/virtual/augmented reality) have strict and low latency requirements for compute and networking tasks. Transmitting data with low latency and jitter is important for such applications. Time-sensitive networking (TSN) standards and solutions for wired (e.g., Ethernet) and wireless (e.g., Wi-Fi and 5G) networks haven been developed as means to ensure deterministic connectivity services that implement low latency and jitter. However, aligning packet transmission time with radio resource availability in such networks can be challenging.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Some embodiments relate to methods, computer-readable media, and apparatus for processing an EHT Physical Layer Convergence Procedure (PLCP) Protocol Data Unit (PPDU) with additional packet extension. In some embodiments, a physical layer (PHY) packet extension (PE) may be used to meet the trigger frame (TF) media access control (MAC) padding duration indicated by the MinTrigProcTime indicator, which is the time claimed by a client station (STA) to process the TF. However, due to the maximum 16 us duration for the PE field defined in the 802.11ax specification, the duration of the PE field may not be sufficient to meet the requirement of the MinTrigProcTime indicator. The disclosed techniques provide an extension of the PE field (e.g., by using a dummy orthogonal frequency division multiplexing (OFDM) symbol after the data portion of the EHT PPDU) so that the STA can meet the PHY and MAC processing time requirements. Additionally, the access point (AP) can indicate the presence of the PE extension (namely, the presence of the dummy OFDM symbol) using at least one of the fields of the EHT PPDU (e.g., a signal field such as the U-SIG field is used to indicate the presence of the dummy OFDM symbol).

Figure 1:
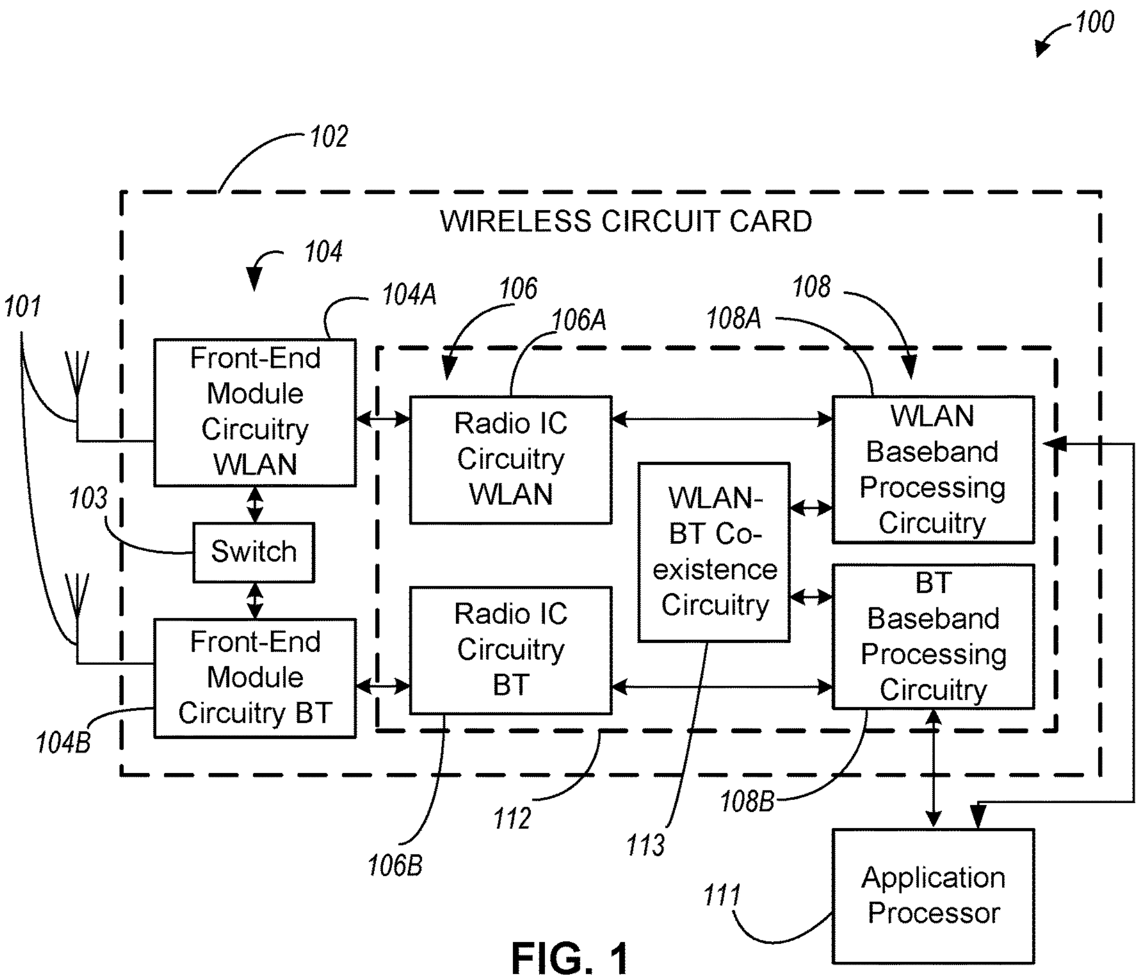
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106, and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN (or Wi-Fi) FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals, and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals, and to provide the amplified versions of the received signals to the BT radio IC circuitry 106B for further processing. WLAN FEM circuitry 104A may also include a transmit signal path which may include circuitry configured to amplify WLAN signals provided by the WLAN radio IC circuitry 106A for wireless transmission by the one or more antennas 101. In addition, BT FEM circuitry 104B may also include a transmit signal path which may include circuitry configured to amplify BT signals provided by the radio IC circuitry 106B for wireless transmission by one or more antennas. In the embodiment of FIG. 1, although WLAN FEM circuitry 104A and BT FEM circuitry 104B are shown as being distinct from one another, embodiments are not so limited and include within their scope the use of a FEM (not shown) that includes a transmit path and/or a receive path for both WLAN and BT signals or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the WLAN FEM circuitry 104A and provide baseband signals to WLAN baseband processing circuitry 108A. BT radio IC circuitry 106B may, in turn, include a receive signal path which may include circuitry to down-convert BT RF signals received from the BT FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the WLAN FEM circuitry 104A for subsequent wireless transmission by one or more antennas 101. BT radio IC circuitry 106B may also include a transmit signal path which may include circuitry to up-convert BT baseband signals provided by the BT baseband processing circuitry 108B and provide BT RF output signals to the BT FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband processing circuitry 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with the application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband processing circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of the WLAN FEM circuitry 104A or the BT FEM circuitry 104B.

In some embodiments, the FEM circuitry 104, the radio IC circuitry 106, and baseband processing circuitry 108 may be provided on a single radio card, such as wireless radio card 102. In some other embodiments, one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be a part of a Wi-Fi communication station (STA) such as a wireless access point (AP), a base station, or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax and 802.11be standards. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the wireless radio card 102, although embodiments are not so limited, and include within their scope discrete WLAN and BT radio cards In some embodiments, the radio architecture 100 may include other radio cards, such as a cellular radio card configured for cellular (e.g., 3GPP such as LTE, LTE-Advanced, or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. However, the scope of the embodiments is not limited concerning the above center frequencies.

Figure 2:
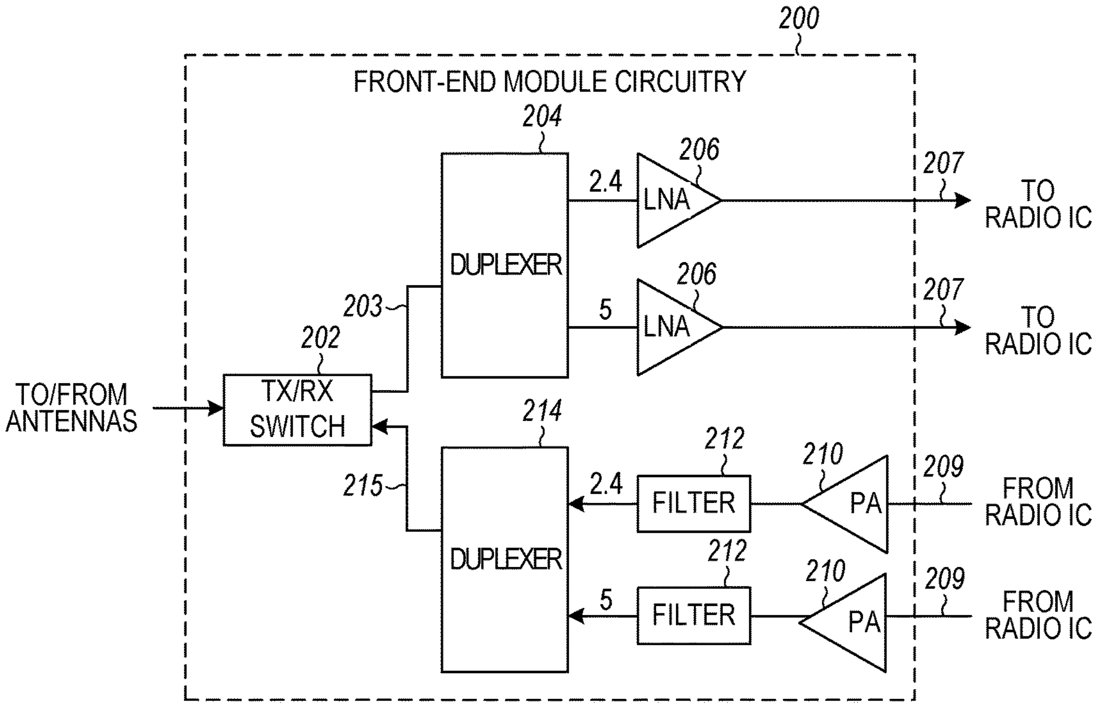
FIG. 2 illustrates front-end module (FEM) circuitry in accordance with some embodiments.

FIG. 2 illustrates FEM circuitry 200 in accordance with some embodiments. The FEM circuitry 200 is one example of circuitry that may be suitable for use as the WLAN FEM circuitry 104A and/or the BT FEM circuitry 104B (of FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and one or more filters 212, such as a BPF, an LPF, or another type of filter for each frequency spectrum and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal paths and may utilize the same FEM circuitry 200 as the one used for WLAN communications.

Figure 3:
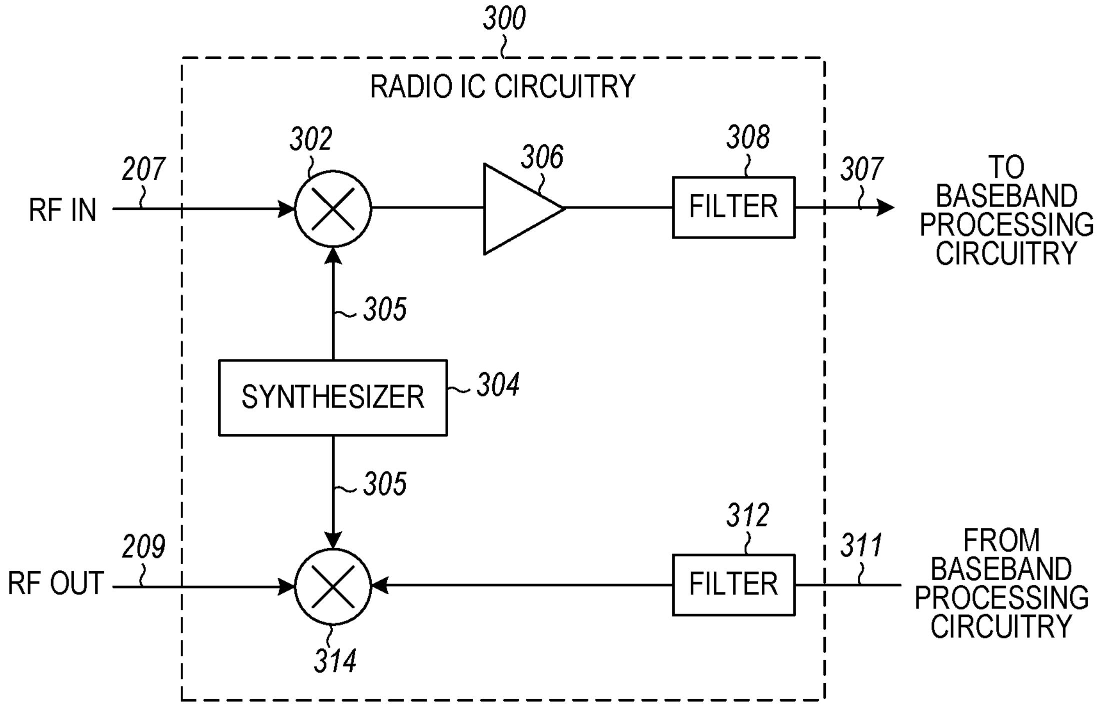
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN radio IC circuitry 106A or the BT radio IC circuitry 106B (of FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 302 and/or 314 may each include one or more mixers, and filter circuitry 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the frequency 305 provided by synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert baseband signals 311 based on the frequency 305 provided by the synthesizer circuitry 304 to generate RF signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF signals 207 from FIG. 3 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between the start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF signals 207 (FIG. 2) may comprise a balanced signal, although the scope of the embodiments is not limited in this respect. The I and Q baseband output signals may be provided to the low-noise amplifier, such as amplifier circuitry 306 (FIG. 3) or filter circuitry 308 (FIG. 3).

In some embodiments, the output baseband signals 307 and the baseband signals 311 may be analog, although the scope of the embodiments is not limited in this respect. In some alternate embodiments, the output baseband signals 307 and the baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage-controlled oscillator (VCO), although that is not a requirement. A divider control input may further be provided by either the baseband processing circuitry 108 (FIG. 1) or the application processor 111 (FIG. 1) depending on the desired output frequency. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as frequency 305, while in other embodiments, frequency 305 may be a fraction of the carrier frequency (e.g., one-half the carrier frequency, one-third the carrier frequency). In some embodiments, frequency 305 may be a LO frequency (fLO).

Figure 4:
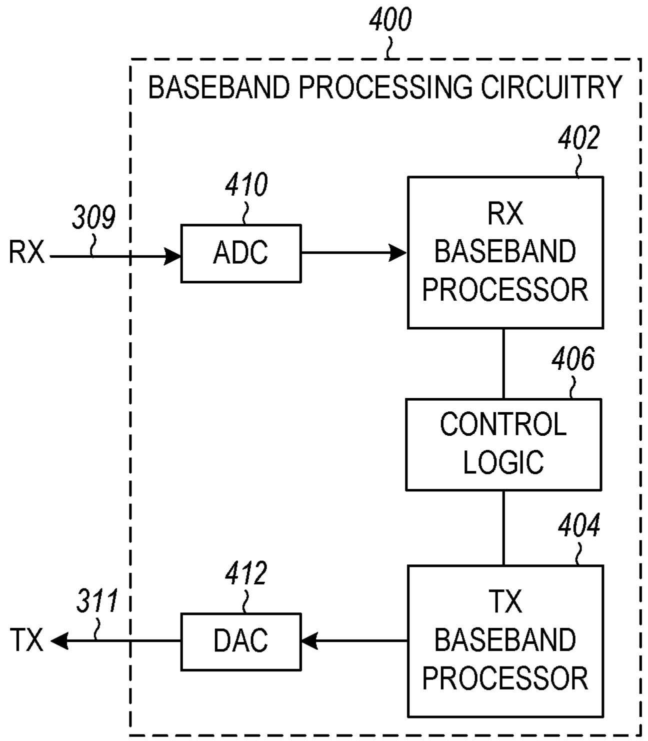
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor 402 for processing receive baseband signals 309 provided by the radio IC circuitry 106 (FIG. 1) and a transmit baseband processor 404 for generating baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the receive baseband processor 402. In these embodiments, the baseband processing circuitry 400 may also include DAC 412 to convert digital baseband signals from the transmit baseband processor 404 to analog baseband signals.

In some embodiments that communicate OFDM signals or OFDMA signals, such as through the WLAN baseband processing circuitry 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the one or more antennas 101 (FIG. 1) may each comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Although the radio architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Figure 5:
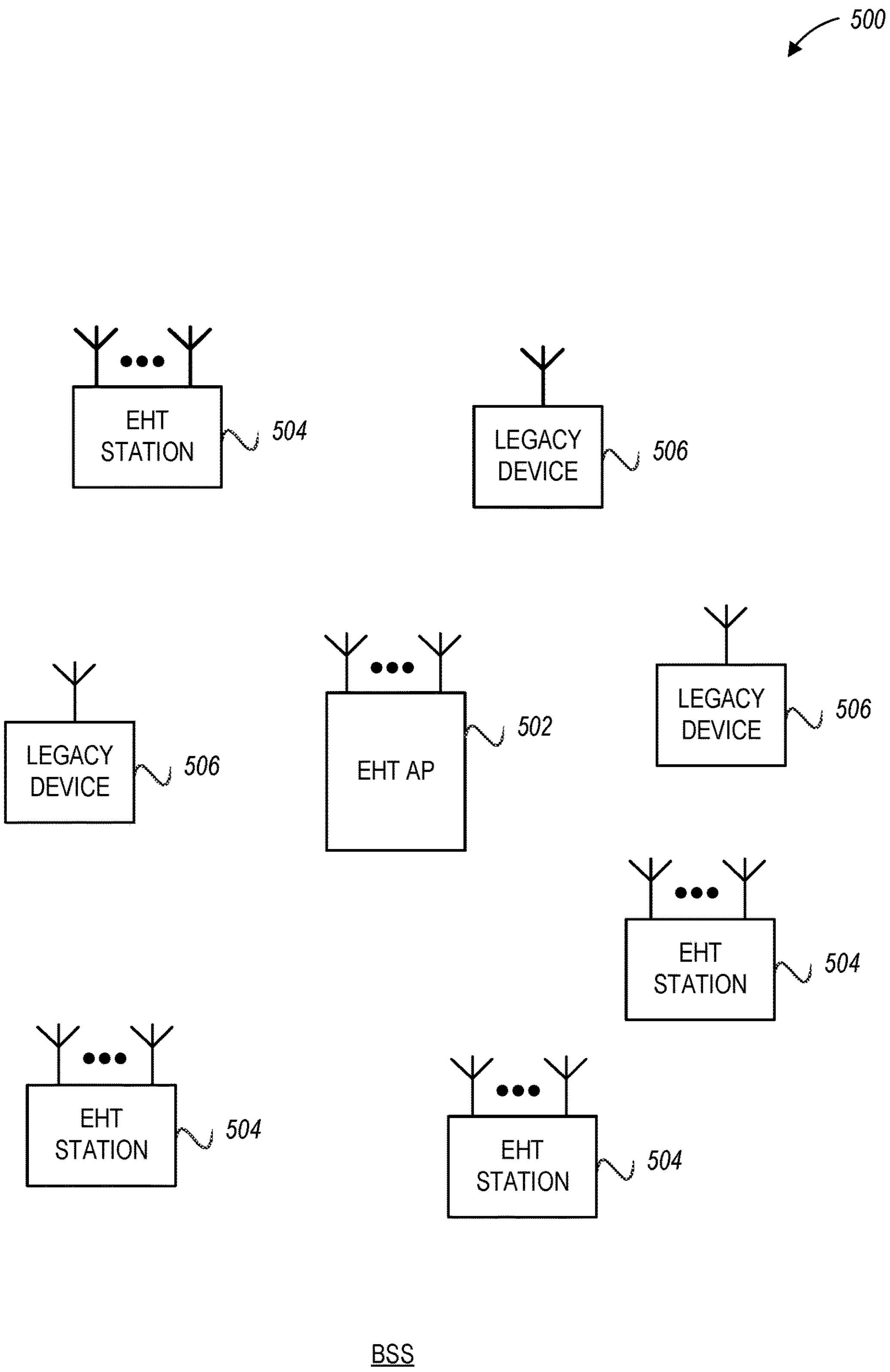
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of extremely high throughput (EHT) (e.g., IEEE 802.11ax/be) stations (STAs) 504, and legacy devices 506 (e.g., IEEE 802.11g/n/ac devices). In some aspects, AP 502 is an EHT AP. In some embodiments, the EHT STAs 504 and/or AP 502 are configured to operate in accordance with IEEE 802.11 EHT. In some embodiments, the EHT STAs 504 and/or AP 502 are configured to operate in accordance with IEEE 802.11az. In some embodiments, IEEE 802.11EHT may be termed Next Generation 802.11. In some embodiments, the AP 502 may be configured to operate a HE BSS, ER BSS, and/or a BSS. Legacy devices may not be able to operate in the HE BSS and beacon frames in the HE BSS may be transmitted using HE PPDUs. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS may use different BSSIDs.

The AP 502 may be an AP using IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to more than one HE APs and may control more than one BSS, e.g., assign primary channels, colors, etc. AP 502 may be connected to the Internet. The AP 502 and/or EHT STA 504 may be configured for one or more of the following: 320 MHz bandwidth, 16 spatial streams, multi-band or multi-stream operation, and 4096 QAM. Additionally, the AP 502 and/or EHT STA 504 may be configured for generating and processing EHT PPDUs that include an extension of the PE field (e.g., a dummy OFDM symbol) (e.g., as disclosed in conjunction with FIG. 8-FIG. 11) to meet both PHY and MAC processing time requirements.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephones, portable electronic wireless communication devices, smart telephones, handheld wireless devices, wireless glasses, wireless watches, wireless personal devices, tablets, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The AP 502 may communicate with legacy devices 506 in accordance with legacy IEEE 802.11 communication techniques. In example embodiments, the AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a Physical Layer Convergence Procedure (PLCP) Protocol Data Unit (PPDU). In some embodiments, there may be different types of PPDUs that may have different fields and different physical layers, and/or different media access control (MAC) layers. For example, a single-user (SU) PPDU, multiple-user (MU) PPDU, extended-range (ER) SU PPDU, and/or trigger-based (TB) PPDU. In some embodiments, EHT may be the same or similar to HE PPDUs.

The bandwidth of a channel may be 20 MHz, 40 MHz, or 80 MHz, 80+80 MHz, 160 MHz, 160+160 MHz, 320 MHz, 320+320 MHz, and 640 MHz bandwidths. In some embodiments, the bandwidth of a channel less than 20 MHz may be 1 MHz, 1.25 MHz, 2.03 MHz, 2.5 MHz, 4.06 MHz, 5 MHz, and 10 MHz, or a combination thereof or another bandwidth that is less or equal to the available bandwidth may also be used. In some embodiments, the bandwidth of the channels may be based on several active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz, and 80+80 MHz OFDMA HE PPDU formats. In some embodiments, the 106-subcarrier RU is used in the 20 MHz, 40 MHz, 80 MHz, 160 MHz, and 80+80 MHz OFDMA and MU-MIMO HE PPDU formats. In some embodiments, the 242-subcarrier RU is used in the 40 MHz, 80 MHz, 160 MHz, and 80+80 MHz OFDMA and MU-MIMO HE PPDU formats. In some embodiments, the 484-subcarrier RU is used in the 80 MHz, 160 MHz, and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting several spatial streams, which may be in accordance with MU-MIMO and may be in accordance with OFDMA. In other embodiments, the AP 502, the EHT STAs 504, and/or the legacy devices 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), Bluetooth®, low-power Bluetooth®, or other technologies.

In accordance with some IEEE 802.11 embodiments, e.g., IEEE 802.11EHT/ax embodiments, an AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL transmissions from EHT STAs 504. The AP 502 may transmit a time duration of the TXOP and sub-channel information. During the TXOP, EHT STAs 504 may communicate with the AP 502 in accordance with a non-contention-based multiple access technique such as OFDMA or MU-MIMO. This is unlike conventional WLAN communications in which devices communicate in accordance with a contention-based communication technique, rather than multiple access techniques. During the HE or EHT control period, the AP 502 may communicate with EHT STAs 504 using one or more HE or EHT frames. During the TXOP, the EHT STAs 504 may operate on a sub-channel smaller than the operating range of the AP 502. During the TXOP, legacy stations refrain from communicating. The legacy stations may need to receive the communication from the AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments, the trigger frame may indicate a UL-MU-MIMO and/or UL OFDMA TXOP. In some embodiments, the trigger frame may include a DL UL-MU-MIMO and/or DL OFDMA with a schedule indicated in a preamble portion of the trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy devices 506 and/or EHT STAs 504 in accordance with legacy IEEE 802.11 communication techniques. In some embodiments, the AP 502 may also be configurable to communicate with EHT STAs 504 outside the HE TXOP in accordance with legacy IEEE 802.11 or IEEE 802.11EHT/ax communication techniques, although this is not a requirement.

In some embodiments, the EHT STA 504 may be a "group owner" (GO) for peer-to-peer modes of operation. A wireless device may be a HE station or an AP 502. In some embodiments, the EHT STA 504 and/or AP 502 may be configured to operate in accordance with IEEE 802.11mc. In example embodiments, the radio architecture of FIG. 1 is configured to implement the EHT STA 504 and/or the AP 502. In example embodiments, the front-end module circuitry of FIG. 2 is configured to implement the EHT STA 504 and/or the AP 502. In example embodiments, the radio IC circuitry of FIG. 3 is configured to implement the EHT STA 504 and/or the AP 502. In example embodiments, the base-band processing circuitry of FIG. 4 is configured to implement the EHT STA 504 and/or the AP 502.

In example embodiments, the EHT STAs 504, AP 502, an apparatus of the EHT STAs 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-12 or may be implemented as part of devices that perform such methods and operations/functions.

In example embodiments, the EHT STA 504 and/or the AP 502 are configured to perform the methods and operations/functions described herein in conjunction with FIGS. 1-12. In example embodiments, an apparatus of the EHT STA 504 and/or an apparatus of the AP 502 are configured to perform the methods and functions described herein in conjunction with FIGS. 1-12. The term Wi-Fi may refer to one or more of the IEEE 802.11 communication standards. AP and STA may refer to AP 502 and/or EHT STA 504 (or an HE STA) as well as legacy devices 506.

In some embodiments, a HE AP STA may refer to an AP 502 and/or an EHT STAs 504 that is operating as a HE AP. In some embodiments, when an EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next-generation IEEE 802.11 communication protocol, which may be IEEE 802.11be or may be designated another name.

Figure 6:
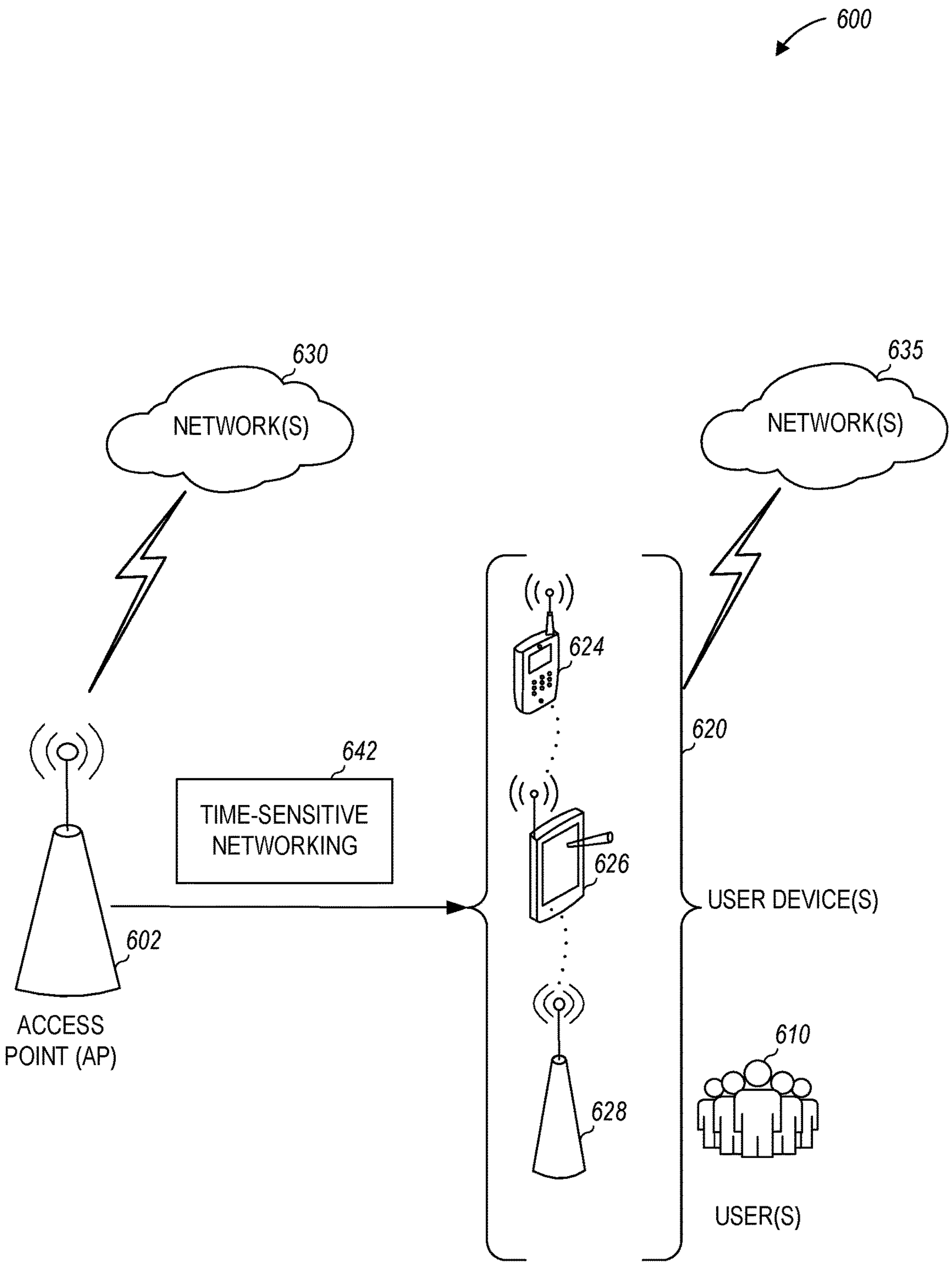
FIG. 6 is a network diagram illustrating an example network environment for time-sensitive networking (TSN), in accordance with some embodiments.

FIG. 6 is a network diagram illustrating an example network environment for time-sensitive networking (TSN), in accordance with some embodiments. Wireless network 600 may include one or more user devices 620 and at least one access point (AP) 602, which may communicate in accordance with IEEE 802.11 communication standards. The one or more user devices 620 may be mobile devices that are non-stationary (e.g., not having fixed locations) or may be stationary devices. In some embodiments, the one or more user devices 620 and the at least one AP 602 may include one or more computer systems similar to that of the functional diagram of FIG. 11 or FIG. 12.

The one or more user devices 620 and/or at least one AP 602 may be operable by one or more users 610. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more user devices 620 and the at least one AP 602 may be STAs. The one or more user devices 620 and/or the at least one AP 602 may operate as a personal basic service set (PBSS) control point/access point (PCP/AP). The one or more user devices 620 (e.g., user device 624, user device 626, or user device 628) and/or the at least one AP 602 may include any suitable processor-driven device including, but not limited to, a mobile device or a non-mobile, e.g., a static device. For example, the one or more user devices 620 and/or the at least one AP 602 may include, user equipment (UE), an STA, an AP, or another device. The one or more user device 620 and/or the at least one AP 602 may also include mesh stations in, for example, a mesh network, in accordance with one or more IEEE 802.11 standards and/or 3GPP standards.

Any of the one or more user devices 620 (e.g., user devices 624-628) and the at least one AP 602 may be configured to communicate with each other via one or more communications networks 630 and/or 635, which can be wireless or wired networks. The one or more user devices 620 may also communicate peer-to-peer or directly with each other with or without the at least one AP 602. Any of the one or more communications networks 630 and/or 635 may include but is not limited to, any one of a combination of different types of suitable communications networks such as broadcasting networks, cable networks, public networks (e.g., the Internet), private networks, wireless networks, cellular networks, or any other suitable private and/or public networks.

Any of the one or more user devices 620 (e.g., user devices 624-628) and the at least one AP 602 may include one or more communications antennas. The one or more communications antennas may be any suitable type of antenna corresponding to the communications protocols used by the one or more user devices 620 (e.g., user devices 624-628), and the at least one AP 602. Some non-limiting examples of suitable communications antennas include Wi-Fi antennas, the Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the one or more user devices 620 and/or the at least one AP 602.

Any of the one or more user devices 620 (e.g., user devices 624-628) and the at least one AP 602 may be configured to perform directional transmission and/or directional reception in conjunction with wirelessly communicating in a wireless network. Any of the one or more user devices 620 (e.g., user devices 624-628) and the at least one AP 602 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the one or more user devices 620 (e.g., user devices 624-628), and the at least one AP 602 may be configured to perform any given directional transmission towards one or more defined transmit sectors. Any of the one or more user devices 620 (e.g., user devices 624-628) and the at least one AP 602 may be configured to perform any given directional reception from one or more defined receive sectors.

MIMO beamforming in a wireless network may be accomplished using RF beamforming and/or digital beamforming. In some embodiments, in performing a given MIMO transmission, any of the one or more user devices 620 (e.g., user devices 624-628) and the at least one AP 602 may be configured to use all or a subset of its one or more communications antennas to perform MIMO beamforming.

Any of the one or more user devices 620 (e.g., user devices 624-628) and the at least one AP 602 may include any suitable radio and/or transceiver for transmitting and/or receiving radio frequency (RF) signals in the bandwidth and/or channels corresponding to the communications protocols utilized by any of the one or more user devices 620 and the at least one AP 602 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHz channels (e.g. 802.11ad, 802.11ay). 700 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 702.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband. IEEE draft specification IEEE P802.11ax/D4.0, February 2019 is incorporated herein by reference in its entirety.

In one embodiment, and with reference to FIG. 6, the at least one AP 602 may facilitate time-sensitive networking 642 with the one or more user devices 620 using the disclosed techniques. It is understood that the above descriptions are for purposes of illustration and are not meant to be limiting.

Many distributed time-sensitive applications (e.g. robotics, industry automation, extended/virtual/augmented reality) have strict and low latency requirements for compute and networking tasks. Transmitting data with low latency and jitter is important. Time-sensitive networking (TSN) standards and solutions for wired (Ethernet) and wireless (Wi-Fi and 5G) networks haven been developed as means to ensure deterministic connectivity services that ensure low latency and jitter.

Figure 7:
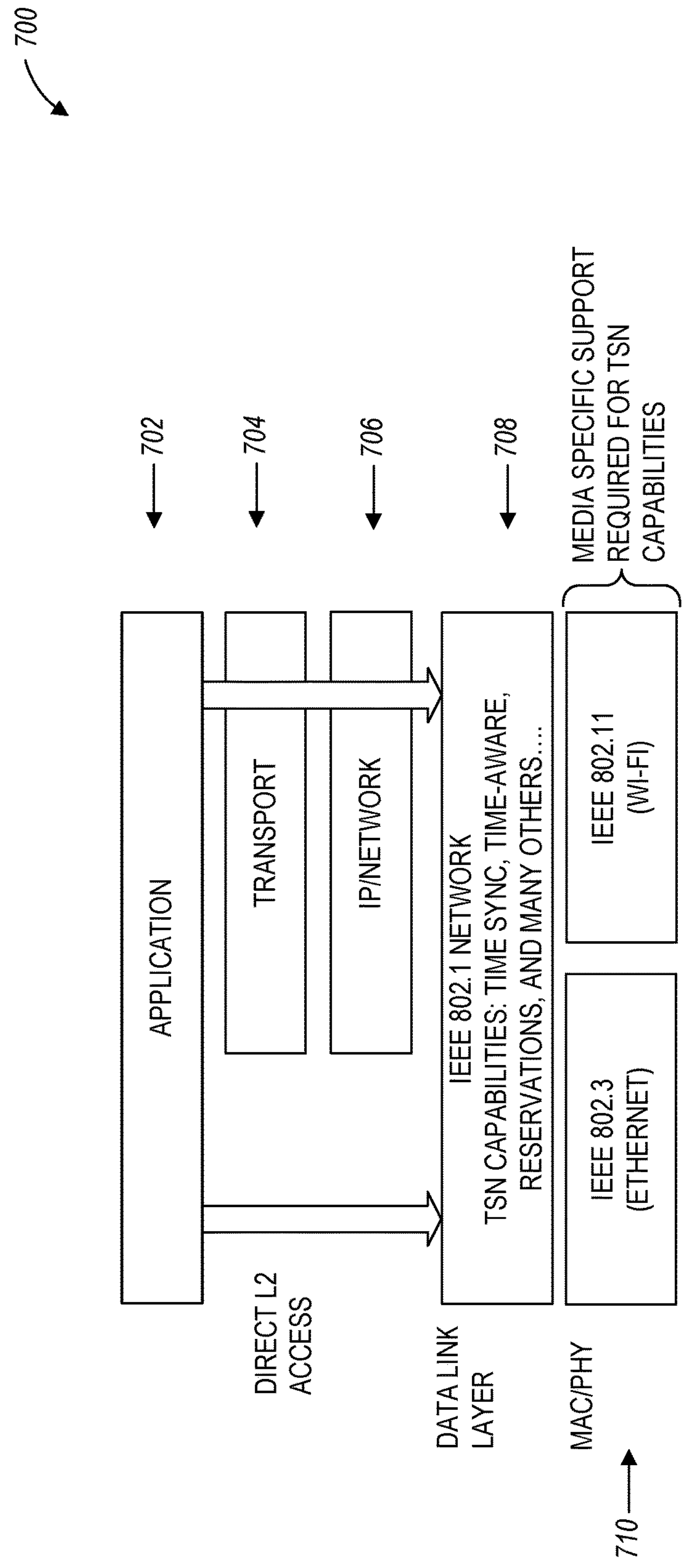
FIG. 7 is a diagram of a TSN reference stack that can be used in connection with disclosed techniques, in accordance with some embodiments.

FIG. 7 is a diagram of a TSN reference stack 700 which can be used in connection with disclosed techniques, in accordance with some embodiments. Referring to FIG. 7, the TSN reference stack 700 includes an application layer 702, a transport layer 704, an Internet protocol (IP)/network layer 706, a data link layer 708, and media access control (MAC)/physical (PHY) layer 710. The application layer can be configured with direct layer 2 (L2) access to the data link layer 708.

In some embodiments, applications can be configured to indicate (or describe) the expected transmission time for its data in Ethernet network interface cards (NICs) supporting TSN features. In some aspects, applications can use sockets to send data across the network. During this process, the applications can set various options in the socket to indicate how the data in the packet needs to be treated by the lower layers in the networking stack. In some aspects, a TSN application uses the SO_TXTIME socket option to configure the transmission time for each frame. In some aspects, the application uses this method to indicate to the network adapter the expected transmission time of the time-critical packet. This information is used by the networking stack (e.g., the TSN reference stack 700) and TSN-capable Ethernet network adapters to schedule the packet for transmission. In some aspects, this metadata can be inserted or modified by an intermediate layer above the network stack to align transmission times to schedules. The Ethernet network adapter uses this information to prioritize and schedule time-sensitive packets to ensure timely delivery of the packets with very low jitter.

In a wired network, a device can sense the medium and if the medium or the wire is immediately available, the station can transmit the packet. Aligning the transmission time of the packets with the medium access can be done by implementing TSN features (e.g. 802.1Qbv scheduling) in the Ethernet network adapter using launch time information (e.g., information indicating a desired time a data packet can be communicated). However, the alignment of time-sensitive application data transmissions with the medium access in a wireless (e.g., 802.11-based) network depends on the availability of radio resources at the transmission time of the frame. In a wireless environment, the precise transmission time for a data packet can depend on many factors. In the case of 802.11 networks, the transmission time can be determined by the medium access control (MAC) procedures, which includes internal contention within each 802.11 station (STA) as well as external contention due to carrier sense multiple access (CSMA) across STAs on the network to access the channel.

Figure 8:
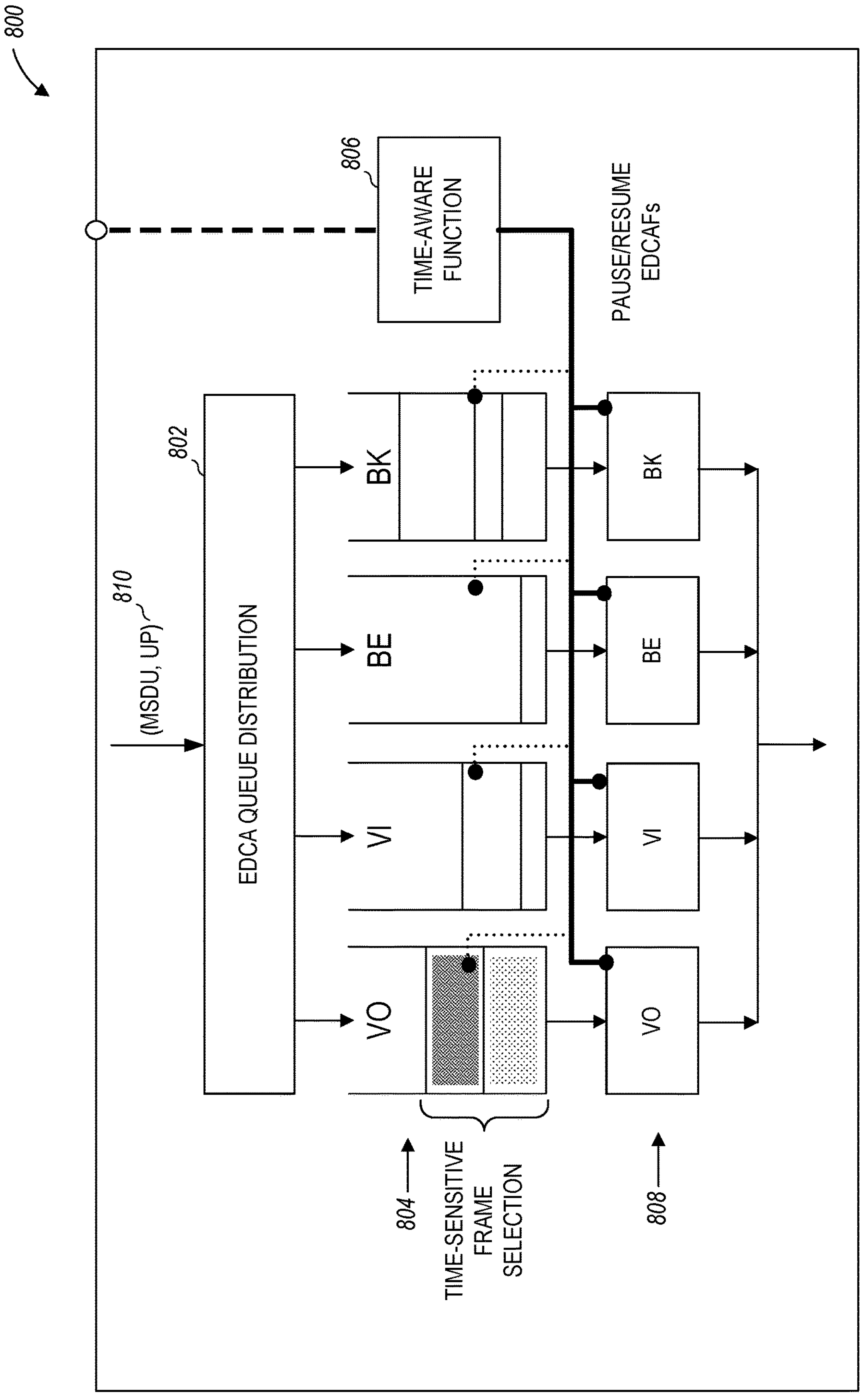
FIG. 8 is a diagram of media access control (MAC) layer processing of frames using a time-aware function, in accordance with some embodiments.

FIG. 8 is a diagram of a media access control (MAC) layer processing 800 of frames using a time-aware function, in accordance with some embodiments. Referring to FIG. 8, the MAC layer processing 800 can be configured at a wireless STA and can be based on Enhanced Distributed Channel Access (EDCA) mode processing where four independent transmission queues 804 and channel access functions (e.g., EDCA functions 808, or EDCAFs 808) compete for access within each STA. The transmission queues 804 include a voice (VO) transmission queue, a video (VI) transmission queue, a best effort (BE) transmission queue, and a background (BK) transmission queue.

MAC service data unit (MSDU) 810 is received and user priority (UP) information is obtained from the MSDU. The UP information is used by the EDCA queue distribution function 802 to distribute the data packet of the MSDU to one of the transmission queues 804 based on the UP information.

In some aspects, the EDCA channel access parameters provide priorities to the traffic mapped to each queue/access category (AC). When a queue/AC gains access to the channel, a packet is selected from the corresponding queue for transmission, therefore, establishing the precise transmission time for such packet. Gaining access to the channel and setting the transmission time for the next data frame depends on the state of other competing ACs across all STAs sharing the wireless channel.

In some aspects, the channel access procedure can be aligned with TSN time-aware scheduling (e.g., 802.1Qbv-based scheduling) through centralized scheduling and restricted/protected service periods based on traffic flow quality of service (QoS) parameters. In some aspects, the time-aware function 806 is configured to provide the capability to pause/resume the EDCA queues (e.g., transmission queues controlled by EDCAFs 808) and prioritize/select packets for transmission based on traffic profile characteristics provided from higher layers. In some aspects, the target weight time (TWT) service periods can be used to align medium access with protected windows defined by time-aware scheduling based on 802.1Qbv configurations.

In some aspects, the time-aware function 806 exposes an interface to the higher layer, which is responsible for controlling the EDCA functions in each STA based on scheduling information received from a central scheduler and/or the AP. However, there are several considerations with this approach:

(a) The assumption that a higher layer application can control the behavior of the 802.11 MAC layer queues (implemented in firmware/hardware) may add significant overhead and delays. Additionally, there are no further specifications on how to convert scheduling information into the configuration/control of the time-aware function.

(b) The time-aware function depends on the availability of TSN capabilities across the network. If TSN capabilities are not available or implemented across the network, the 802.11 MAC layer cannot control its queues to enable alignment between application data generation and transmission times with low latency and jitter.

(c) When the TSN features are available on the network, there is an assumption that application data will be generated synchronously with the network schedule and time-sensitive data will be readily available for transmission aligned with the periodic service periods reserved over the link. Data transmissions are expected to only take place within reserved service periods. Although some applications (e.g., industrial controller) may be tightly synchronized with the network, other applications may exhibit dynamic behavior, e.g., the availability of a data burst may be delayed due to higher computation time in a real-time XR/gaming application. When applications are not tightly synchronized with the network time/schedule or dynamic changes happen in the traffic flow, the static service periods aligned with the time-aware schedule may not align with the data packet availability adding further transmission latency.

The disclosed techniques may be used to provide an efficient mechanism to deal with contention within STAs and better align data generation and availability with the 802.11 channel access to reduce latency and jitter in data transmissions. The disclosed techniques may also be used to enable signaling to indicate immediate time-aware scheduling requirements (e.g., expected transmission time) across a wireless link to ensure the medium is available for transmissions at the expected time to reduce latency and jitter. The disclosed techniques provide a solution associated with low latency and jitter at the 802.11 layer, which can optimize operation when TSN capabilities are available, but also benefit real-time applications over Wi-Fi when TSN time-aware scheduling capabilities are not available across the network. The disclosed techniques address the above gaps and needs by using launch time information in the 802.11/Wi-Fi layer.

The disclosed techniques can be based on using launch time capability (e.g., based on using launch time information) for 802.11 data packets and future packets (bursts of packets) and methods for using the launch time to control contention within an STA and reduce latency and jitter for time-critical data. The disclosed techniques also implement a time-aware function at the 802.11 MAC based on launch time information (e.g., metadata) introduced in data frames which indicates desired (or preferred) transmission time of the data frame. The disclosed techniques also implement signaling to communicate a launch time across a wireless channel to coordinate channel access to reduce latency and jitter for time-critical data.

Time-critical applications can be aware of their traffic profile and hence their packet transmission schedule. Providing such information to the lower networking/connectivity layers is useful to enable low latency and jitter. Such capability can be configured in Ethernet NICs by using the launch time information. Using this capability in wireless networks such as Wi-Fi can improve wireless performance and determinism.

Many time-critical applications may need to constantly adjust their traffic profile and consequently their packet transmission schedule. Some examples of these applications include applications that offload critical compute to the edge/cloud to take advantage of more powerful compute, such as virtualized controllers/automation for robots and industrial systems and edge/cloud gaming and extended reality. These applications may have to adjust their traffic profile depending on variability associated with the compute resources or the variability associated with the context. In these cases, the applications may know when packets will be available for transmission in the future. This information can be communicated to the wireless network components (e.g., Wi-Fi stations and AP) through metadata as described herein (e.g., using launch time information) and such information can enable the wireless network to better adapt to serve future demands from the applications, enabling not only low latency and jitter but higher efficiency in using the wireless resources.

Figure 9:
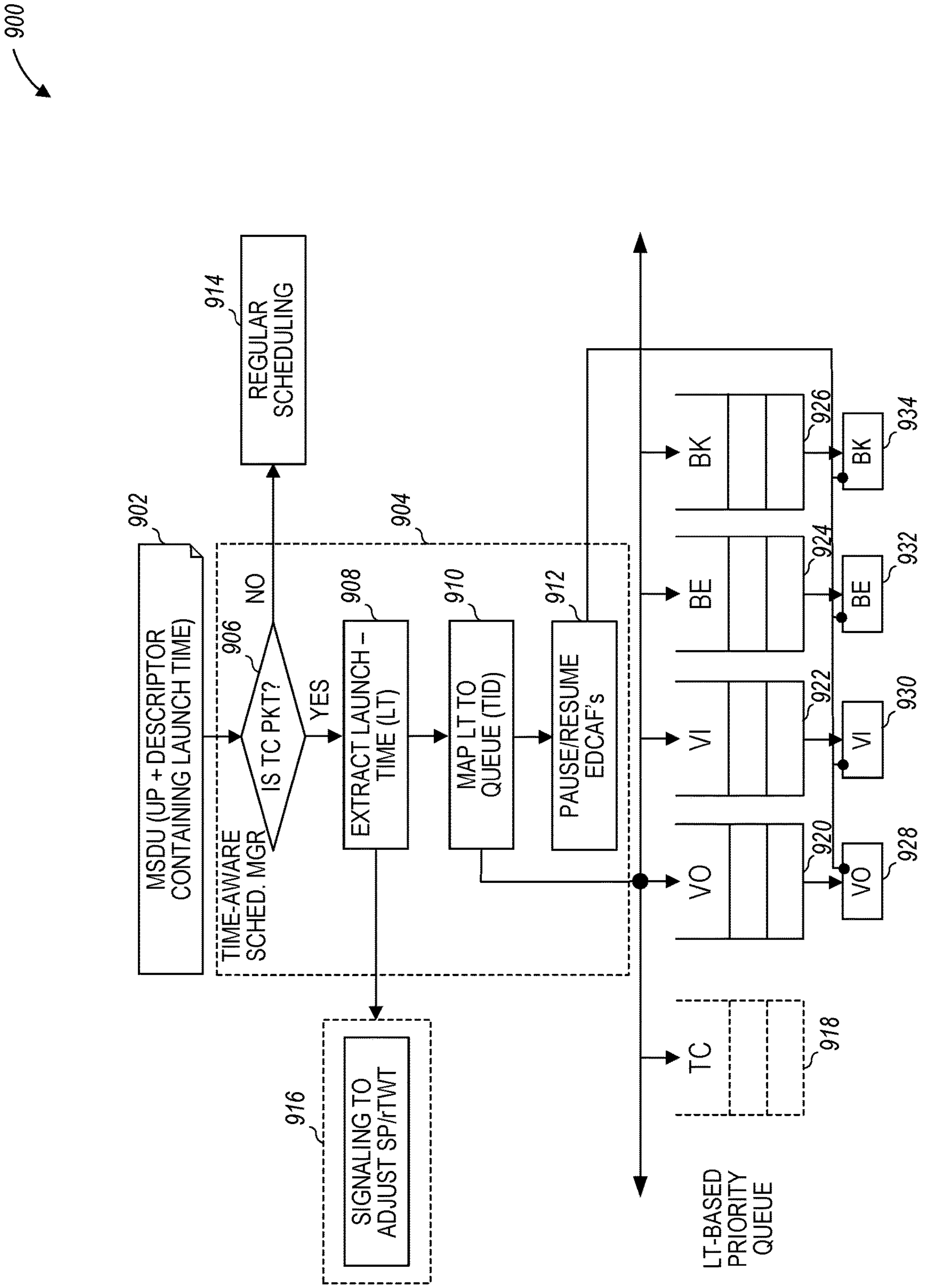
FIG. 9 is a diagram of MAC layer processing of frames using launch time information within the frames, in accordance with some embodiments.

FIG. 9 is a diagram of MAC layer processing of frames using launch time information within the frames, in accordance with some embodiments. Referring to FIG. 9, the MAC layer processing 900 can be configured at a wireless STA and can be based on using a time-aware scheduling manager (TASM) 904. MSDU 902 is received by the TASM 904 and an initial determination is made (at operation 906) as to whether the packet is a time-critical (TC) packet. If the packet is not a TC packet, regular scheduling 914 is performed (e.g., based on the processing discussed in connection with FIG. 8). If the packet is a TC packet, launch time (LT) information is extracted (e.g., from metadata associated with the received MSDU 902) at operation 908. At operation 910, the data packet of MSDU 902 is mapped and placed into one of four independent queues including a VO transmission queue 920, a VI transmission queue 922, a BE transmission queue 924, and a BK transmission queue. In some aspects, such mapping can be based on traffic ID (TID) information contained in the MSDU. Transmission queues 920, 922, 924, and 926 are serviced by corresponding channel access functions (e.g., EDCA functions) 928, 930, 932, and 934.

At operation 912, EDCAFs 928-934 can be paused or resumed to accommodate the transmission queue where the data packet was placed and ensure transmission of the data packet by the LT indicated in the LT information.

In some aspects, MAC layer processing 900 includes an LT-based priority queue 918 (e.g., a dedicated queue that is separate from transmission queues 920-926), which can be used to place data packets received with corresponding LT information.

In some embodiments, a differentiated service code priority (DSCP) tag is extracted from the MSDU 902 and is used (e.g., at operation 910) to place the packet in a corresponding transmission queue based on the DSCP tag. Afterward, queue fulfillment of the transmission queue can be managed (e.g., at operation 912) based on the LT information (e.g., ensuring the data packet is transmitted at the indicated LT or no later than the indicated LT).

In some embodiments, TASM 904 can determine approximate transmission times associated with each of the transmission queues 920-926 and place the received data packet in one of the transmission queues based on the LT information of the packet. Fulfillment of the transmission queues 920-926 can be further managed at operation 912 to ensure the data packet is transmitted at the indicated LT or no later than the indicated LT.

In some embodiments, after LT information is extracted at operation 908, the TASM 904 can encode and transmit signaling (e.g., at operation 916) to the access point (AP) to request an adjustment to a preconfigured service period (SP) or a restricted target weight time (rTWT) associated/reserved for the STA. Such requested adjustment can be based on the LT information, to ensure the data packet is transmitted at the indicated LT or no later than the indicated LT.

The disclosed techniques include methods to enable and take advantage of a launch time feature available for applications to configure the expected transmission time or deadline for the packets over a wireless (Wi-Fi) link. The disclosed launch time (LT) capabilities can enhance existing TSN capabilities in the Wi-Fi layer, such as a time-aware function or it may be used as a standalone feature to improve latency and jitter.

The following configurations are based on using an enhanced time-aware scheduling function using LT.

In some aspects, the time-aware scheduling function can use the launch time field embedded in the packet descriptor to dynamically select the queue and the TID for the packet once it enters the Wi-Fi layer (e.g., as illustrated in FIG. 9). FIG. 9 shows the additional steps performed when receiving the packet from the higher layer. The function assumes that the device driver while sending the MSDU down populates a descriptor with the relevant launch time if such LT was specified by the application. This will happen when the packet data is encapsulated into a MAC frame. The enhanced function can also optionally send the frames to a dedicated priority queue (e.g., the LT-based priority queue 918) based on the LT of the frame if it is available. This function also uses the launch time information to pause and/or resume the relevant EDCAFs 928-934 procedures to make sure that the time-critical packets with the earliest LT get priority when channel access is available.

In some aspects, the following configurations can be used for enhanced signaling to improve chancel access based on LT.

In some embodiments, a device may use the LTs of time-critical frames in the queues and decide whether there is a need to adjust previously agreed resources, such as service periods (e.g. TWT/rTWT SPs) or scheduling agreements with the AP (e.g. based on SCS or other QoS signaling). The launch time information can be used to maintain alignment between the application-generated data and wireless resources available for transmission of the data frame with minimal latency/jitter. If the device finds that the current or previously agreed-upon schedules may result in a mismatch in alignment between the expected launch time and radio resource availability, it can negotiate an adjustment to the agreed SPs/schedule with the AP. For instance, if the launch time for a frame is significantly higher than the next expected SP start time, which may result in the transmission of the frame missing the reserved SP, the device may request an extension (or delay) of the next service period.

In some aspects, if the device is polled in an SP before a known LT, the device may include signaling in the poll response to inform AP about when it will have an uplink (UL) packet. In another embodiment, if the launch time for a frame is earlier than the next expected SP, the device may either send the frame earlier, if it gets access to the channel or sends an immediate service request including the launch time information to the AP to enable transmission of the time-critical frame at an earlier time aligned with the expected launch time.

In one embodiment, the device may have multiple time-critical traffic streams and it may provide launch time information for multiple packets/streams. The AP manages the resources (e.g. TWT/rTWT SPs or scheduling transmissions) and it can use the launch time information to manage the multiple time-critical requirements by adapting how it schedules transmissions and allocates SP to devices in the BSS.

The proposed capabilities can be based on the LTs specified in the frames and are within 500 usec and a few msec so that there is enough time for channel access and any resources/QoS negotiations to take place if needed.

In another embodiment, shared launch time of packets can be used (or burst/groups of packets) that may only be available in the future. Providing this information up front can enable the Wi-Fi layer to ensure channel access and related resources will be available when the next group of packets is ready, thereby minimizing channel access delays. We also propose to create special packet metadata that can be sent down by an application to the Wi-Fi layer to carry the launch time for a future packet or burst/group of packets. The future launch time information will trigger analyses within the device to ensure radio resource availability at the specified launch time including re-negotiations if needed. The special packet will not be sent over the channel and it may be discarded once the future launch time information is read and stored. The device may also store information to be able to identify the future packets/group of packets that are associated with the future launch time (e.g. sequence numbers, flow/stream identification, etc.). This facility may be used in use cases like Video Inertial Odometry (VIO) and Rendering offload for XR applications, where the application may not currently have a packet to send but can predict with some certainty when the packet to send will be ready so that by using this feature it can ensure the media is available when the packet is ready.

In another embodiment, if the STA has no previous resource/QoS agreement with the AP, it can use the launch time information for current and future packets to request service from the AP. For instance, the STA may include the next expected launch time (and any known future launch times) in a management/control frame sent to the AP or in an A-Ctrl field of a Data frame. For example, in the case of a VIO offload using TCP sockets, in response to a received UL camera and inertial measurement unit (IMU) data from a client device, the server device could send a MAC data frame containing the corresponding TCP acknowledgments (ACKs) as well as LT information corresponding to when the pose data will be ready at the server.

Figure 10:
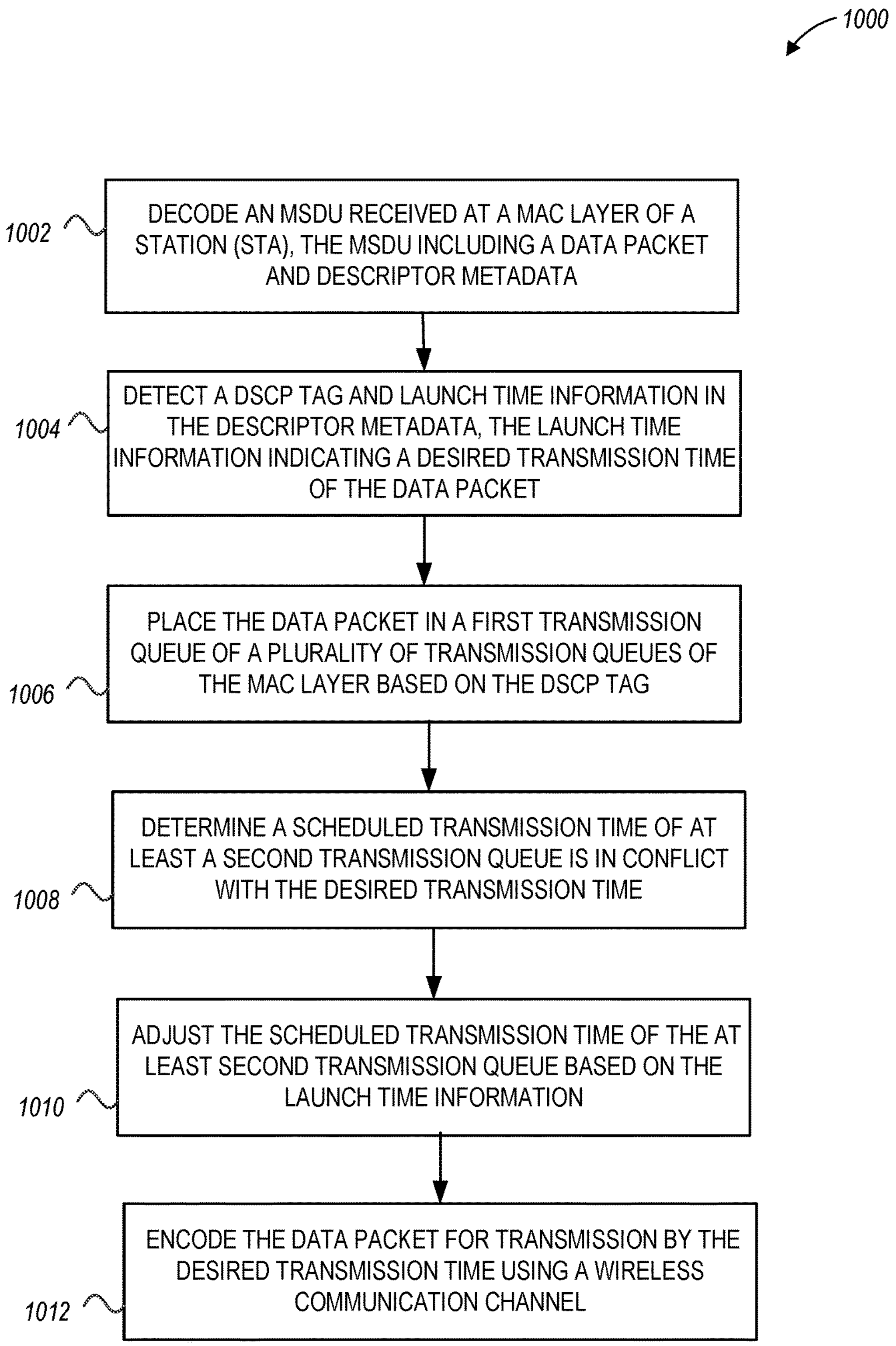
FIG. 10 is a flow diagram of an example method for processing data frames using launch time information, in accordance with some embodiments.

FIG. 10 is a flow diagram of an example method 1000 for processing data frames using launch time information, in accordance with some embodiments. Method 1000 includes operations 1002, 1004, 1006, 1008, 1010, and 1012 which can be performed by the TASM 904 of FIG. 9.

At operation 1002, a media access control (MAC) service data unit (MSDU) received at a MAC layer of an STA is decoded. The MSDU includes a data packet and descriptor metadata.

At operation 1004, a differentiated service code priority (DSCP) tag and launch time information are detected in the descriptor metadata. The launch time information indicates a desired transmission time of the data packet.

At operation 1006, the data packet is placed in a first transmission queue of a plurality of transmission queues of the MAC layer based on the DSCP tag.

At operation 1008, a determination is made that a scheduled transmission time of at least a second transmission queue of the plurality of transmission queues conflicts with the desired transmission time of the data packet.

At operation 1010, the scheduled transmission time of the at least second transmission queue is adjusted based on the launch time information.

At operation 1012, the data packet is encoded for transmission by the desired transmission time using a wireless communication channel.

Figure 11:
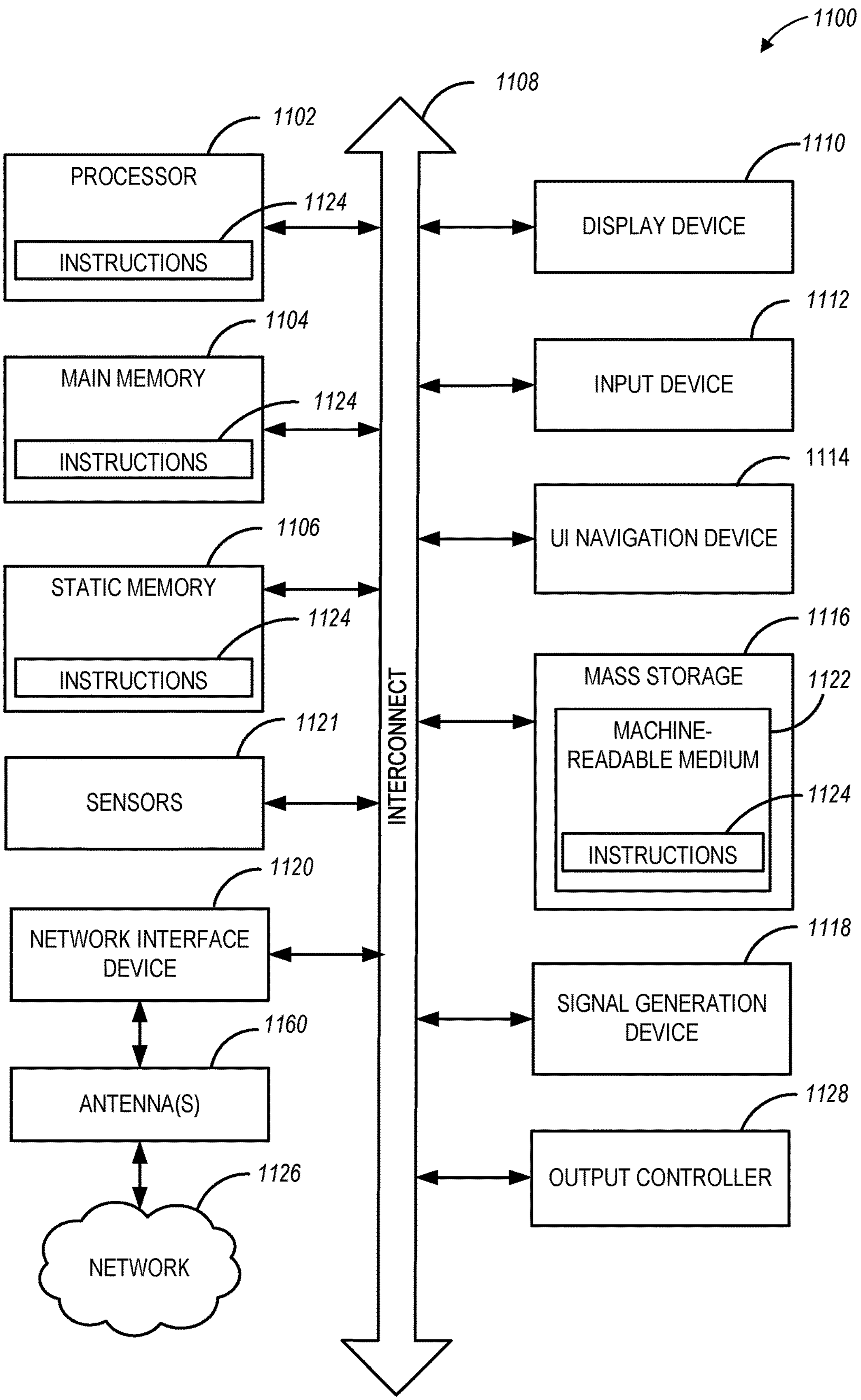
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, machine 1100 may operate in the capacity of a server machine, a client machine, or both in server-client network environments. In an example, machine 1100 may act as a peer machine in a peer-to-peer (P2P) (or other distributed) network environment. The machine 1100 may be an AP 502, EHT station (STA) 504, personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1100 may include a hardware processor 1102 (e.g., a central processing unit (CPU), a graphics processing unit (GPU), a hardware processor core, or any combination thereof), a main memory 1104, and a static memory 1106, some or all of which may communicate with each other via an interlink (e.g., bus) 1108.

Specific examples of main memory 1104 include Random Access Memory (RAM), and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, the input device 1112, and the UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensors. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 1102 and/or instructions 1124 may comprise processing circuitry and/or transceiver circuitry.

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or the hardware processor 1102 during execution thereof by the machine 1100. In an example, one or any combination of the hardware processor 1102, the main memory 1104, the static memory 1106, or the storage device 1116 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 1122 is illustrated as a single medium, the term "machine-readable medium" may include a single medium or multiple media (e.g., a centralized or distributed database, and/or associated caches and servers) configured to store instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, sensors 1121, the network interface device 1120, one or more antennas 1160, a display device 1110, an input device 1112, a UI navigation device 1114, a storage device 1116, instructions 1124, a signal generation device 1118, and an output controller 1128. The apparatus may be configured to perform one or more of the methods and/or operations disclosed herein. The apparatus may be intended as a component of machine 1100 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by machine 1100 and that causes the machine 1100 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1124 may further be transmitted or received over a communications network 1126 using a transmission medium via the network interface device 1120 utilizing any one of several transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding, or carrying instructions for execution by the machine 1100, and includes digital or analog communications signals or other intangible media to facilitate communication of such software.

Examples, as described herein, may include, or may operate on, logic or several components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

Figure 12:
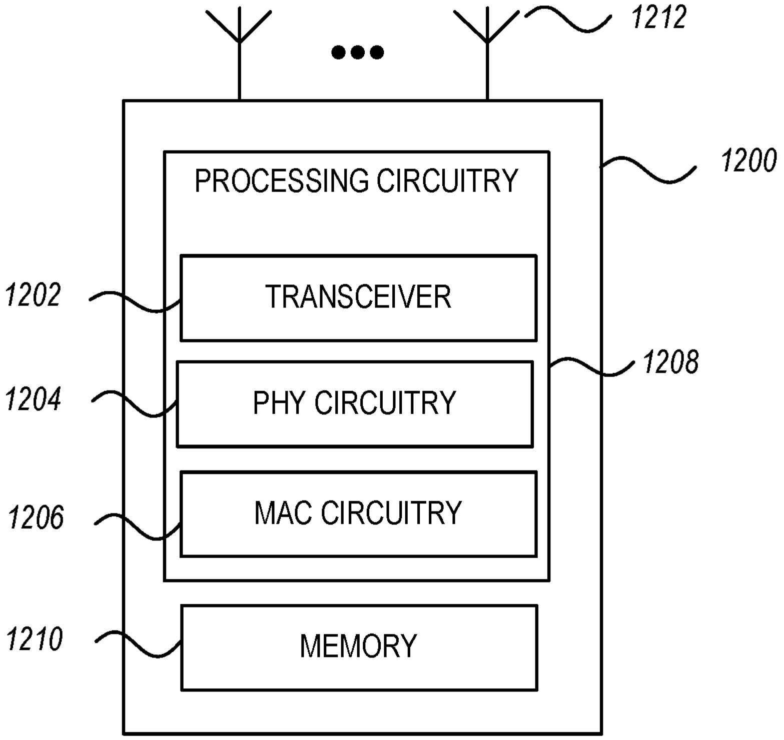
FIG. 12 illustrates a block diagram of an example wireless device upon which any one or more of the techniques (e.g., methodologies or operations) discussed herein may perform.

FIG. 12 illustrates a block diagram of an example wireless device 1200 upon which any one or more of the techniques (e.g., methodologies or operations) discussed herein may perform. The wireless device 1200 may be a HE device or a HE wireless device. The wireless device 1200 may be an EHT STA 504, AP 502, and/or a HE STA or HE AP. An EHT STA 504, AP 502, and/or a HE AP or HE STA may include some or all of the components shown in FIGS. 1-12. The wireless device 1200 may be an example of machine 1100 as disclosed in conjunction with FIG. 11.

The wireless device 1200 may include processing circuitry 1208. The processing circuitry 1208 may include a transceiver 1202, physical layer circuitry (PHY circuitry) 1204, and MAC layer circuitry (MAC circuitry) 1206, one or more of which may enable transmission and reception of signals to and from other wireless devices (e.g., AP 502, EHT STA 504, and/or legacy devices 506) using one or more antennas 1212. As an example, the PHY circuitry 1204 may perform various encoding and decoding functions that may include the formation of baseband signals for transmission and decoding of received signals. As another example, the transceiver 1202 may perform various transmission and reception functions such as the conversion of signals between a baseband range and a Radio Frequency (RF) range.

Accordingly, the PHY circuitry 1204 and the transceiver 1202 may be separate components or may be part of a combined component, e.g., processing circuitry 1208. In addition, some of the described functionality related to the transmission and reception of signals may be performed by a combination that may include one, any, or all of the PHY circuitry 1204 the transceiver 1202, MAC circuitry 1206, memory 1210, and other components or layers. The MAC circuitry 1206 may control access to the wireless medium. The wireless device 1200 may also include memory 1210 arranged to perform the operations described herein, e.g., some of the operations described herein may be performed by instructions stored in memory 1210.

The one or more antennas 1212 (some embodiments may include only one antenna) may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the one or more antennas 1212 may be effectively separated to take advantage of spatial diversity and the different channel characteristics that may result.

One or more of the memory 1210, the transceiver 1202, the PHY circuitry 1204, the MAC circuitry 1206, the one or more antennas 1212, and/or the processing circuitry 1208 may be coupled with one another. Moreover, although memory 1210, the transceiver 1202, the PHY circuitry 1204, the MAC circuitry 1206, the one or more antennas 1212 are illustrated as separate components, one or more of memory 1210, the transceiver 1202, the PHY circuitry 1204, the MAC circuitry 1206, the one or more antennas 1212 may be integrated into an electronic package or chip.

In some embodiments, the wireless device 1200 may be a mobile device as described in conjunction with FIG. 11. In some embodiments, the wireless device 1200 may be configured to operate under one or more wireless communication standards as described herein. In some embodiments, the wireless device 1200 may include one or more of the components as described in conjunction with FIG. 11 (e.g., the display device 1110, input device 1112, etc.) Although the wireless device 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

In some embodiments, an apparatus of or used by the wireless device 1200 may include various components of the wireless device 1200 as shown in FIG. 12 and/or components from FIGS. 1-11. Accordingly, techniques and operations described herein that refer to the wireless device 1200 may apply to an apparatus for a wireless device 1200 (e.g., AP 502 and/or EHT STA 504), in some embodiments. In some embodiments, the wireless device 1200 is configured to decode and/or encode signals, packets, and/or frames as described herein, e.g., PPDUs.

In some embodiments, the MAC circuitry 1206 may be arranged to contend for a wireless medium during a contention period to receive control of the medium for a HE TXOP and encode or decode an HE PPDU. In some embodiments, the MAC circuitry 1206 may be arranged to contend for the wireless medium based on channel contention settings, a transmitting power level, and a clear channel assessment level (e.g., energy detect level).

The PHY circuitry 1204 may be arranged to transmit signals following one or more communication standards described herein. For example, the PHY circuitry 1204 may be configured to transmit a HE PPDU. The PHY circuitry 1204 may include circuitry for modulation/demodulation, upconversion/downconversion, filtering, amplification, etc. In some embodiments, the processing circuitry 1208 may include one or more processors. The processing circuitry 1208 may be configured to perform functions based on instructions being stored in a RAM or ROM, or based on special-purpose circuitry. The processing circuitry 1208 may include a processor such as a general-purpose processor or a special-purpose processor. The processing circuitry 1208 may implement one or more functions associated with one or more antennas 1212, the transceiver 1202, the PHY circuitry 1204, the MAC circuitry 1206, and/or the memory 1210. In some embodiments, the processing circuitry 1208 may be configured to perform one or more of the functions/operations and/or methods described herein.

In mmWave technology, communication between a station (e.g., the EHT stations 504 of FIG. 5 or wireless device 1200) and an access point (e.g., the AP 502 of FIG. 5 or wireless device 1200) may use associated effective wireless channels that are highly directionally dependent. To accommodate the directionality, beamforming techniques may be utilized to radiate energy in a certain direction with a certain beam width to communicate between two devices. The directed propagation concentrates transmitted energy toward a target device to compensate for significant energy loss in the channel between the two communicating devices. Using directed transmission may extend the range of the millimeter-wave communication versus utilizing the same transmitted energy in omnidirectional propagation.

Examples, as described herein, may include, or may operate on, logic or several components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either concerning a particular example (or one or more aspects thereof) or concerning other examples (or one or more aspects thereof) shown or described herein.

Publications, patents, and patent documents referred to in this document are incorporated by reference herein in their entirety, as though individually incorporated by reference. In the event of inconsistent usage between this document and those documents so incorporated by reference, the usage in the incorporated reference(s) is supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in several environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each antenna and the antennas of a transmitting station. In some MIMO embodiments, antennas may be separated by up to 1/10 of a wavelength or more.

Described implementations of the subject matter can include one or more features, alone or in combination as illustrated below by way of examples.

Example 1 is an apparatus of a station (STA), the apparatus comprising: memory; and processing circuitry coupled to the memory, the processing circuitry is to: decode a media access control (MAC) service data unit (MSDU) received at a MAC layer of the STA, the MSDU including a data packet and descriptor metadata; detect a differentiated service code priority (DSCP) tag and launch time information in the descriptor metadata, the launch time information indicating a desired transmission time of the data packet; place the data packet in a first transmission queue of a plurality of transmission queues of the MAC layer based on the DSCP tag; determine a scheduled transmission time of at least a second transmission queue of the plurality of transmission queues conflicts with the desired transmission time of the data packet; adjust the scheduled transmission time of the at least second transmission queue based on the launch time information; and encode the data packet for transmission by the desired transmission time using a wireless communication channel.

In Example 2, the subject matter of Example 1 includes subject matter where to adjust the scheduled transmission time the processing circuitry is to: pause a scheduled transmission of the at least second transmission queue associated with the scheduled transmission time using an enhanced distributed channel access (EDCA) function of a plurality of EDCA functions corresponding to the plurality of transmission queues.

In Example 3, the subject matter of Example 2 includes subject matter where the processing circuitry is to: detect at least a second scheduled transmission time of the at least second transmission queue conflicts with the desired transmission time of the data packet; perform one or both of pausing and resuming at least a second scheduled transmission corresponding to the at least a second scheduled transmission time to obtain an available time slot at or before the desired transmission time of the data packet; and encode the data packet for transmission during the available time slot using the wireless communication channel.

In Example 4, the subject matter of Examples 1-3 includes subject matter where the processing circuitry is to: configure a launch time-based priority queue in the MAC layer, the launch time-based priority queue being separate from the plurality of transmission queues.

In Example 5, the subject matter of Example 4 includes subject matter where the processing circuitry is to: decode a second MSDU received at the MAC layer of the STA, the second MSDU including a second data packet and second descriptor metadata, and the second descriptor metadata including second launch time information indicating a desired transmission time of the second data packet; and place the second data packet in the launch time-based priority queue based on the second launch time information.

In Example 6, the subject matter of Example 5 includes subject matter where the processing circuitry is to: perform one or both of pausing and resuming the at least one of the plurality of transmission queues to obtain an available time slot at or before the desired transmission time of the second data packet; and encode the second data packet for transmission during the available time slot using the wireless communication channel.

In Example 7, the subject matter of Examples 1-6 includes subject matter where the processing circuitry is to: decode configuration signaling received from an access point (AP), the configuration signaling indicating at least one service period (SP), the at least one SP associated with dedicated channel access to the wireless communication channel by the at least second transmission queue.

In Example 8, the subject matter of Example 7 includes subject matter where the processing circuitry is to: encode control signaling for transmission to the AP, the control signaling requesting an adjustment of a duration of the at least one SP of the at least second transmission queue based on the desired transmission time of the data packet indicated by the launch time information.

In Example 9, the subject matter of Examples 1-8 includes subject matter where the processing circuitry is to: decode configuration signaling received from an access point (AP), the configuration signaling indicating at least one service period (SP), the at least one SP associated with dedicated channel access to the wireless communication channel by the first transmission queue of the plurality of transmission queues; and encode control signaling for transmission to the AP, the control signaling requesting an adjustment of a duration of the at least one SP of the first transmission queue based on the desired transmission time of the data packet indicated by the launch time information.

In Example 10, the subject matter of Examples 1-9 includes subject matter where the plurality of transmission queues comprises a voice (VO) transmission queue, a video (VI) transmission queue, a best effort (BE) transmission queue, and a background (BK) transmission queue.

Example 11 is an apparatus of a station (STA), the apparatus comprising: memory; and processing circuitry coupled to the memory, the processing circuitry is to: decode a media access control (MAC) service data unit (MSDU) received at a MAC layer of the STA, the MSDU including a data packet and descriptor metadata; parse the descriptor metadata to obtain launch time information, the launch time information indicating a desired transmission time of the data packet; determine a plurality of scheduled transmission times associated with a plurality of transmission queues of the MAC layer; select a scheduled transmission time of the plurality of scheduled transmission times based on the desired transmission time; place the data packet in a transmission queue of the plurality of transmission queues, the transmission queue associated with the selected scheduled transmission time; and encode the data packet for transmission by the desired transmission time using a wireless communication channel.

In Example 12, the subject matter of Example 11 includes subject matter where the processing circuitry is to: select the scheduled transmission time of the plurality of scheduled transmission times based on the scheduled transmission time being lower than the desired transmission time.

Example 13 is a non-transitory computer-readable storage medium that stores instructions for execution by one or more processors of an apparatus of a station (STA), the instructions to cause the one or more processors to: decode a media access control (MAC) service data unit (MSDU) received at a MAC layer of the STA, the MSDU including a data packet and descriptor metadata; detect a differentiated service code priority (DSCP) tag and launch time information in the descriptor metadata, the launch time information indicating a desired transmission time of the data packet; place the data packet in a first transmission queue of a plurality of transmission queues of the MAC layer based on the DSCP tag; determine a scheduled transmission time of at least a second transmission queue of the plurality of transmission queues conflicts with the desired transmission time of the data packet; adjust the scheduled transmission time of the at least second transmission queue based on the launch time information; and encode the data packet for transmission by the desired transmission time using a wireless communication channel.

In Example 14, the subject matter of Example 13 includes subject matter where the instructions further cause the one or more processors to: pause a scheduled transmission of the at least second transmission queue associated with the scheduled transmission time using an enhanced distributed channel access (EDCA) function of a plurality of EDCA functions corresponding to the plurality of transmission queues.

In Example 15, the subject matter of Example 14 includes subject matter where the instructions further cause the one or more processors to: detect at least a second scheduled transmission time of the at least second transmission queue conflicts with the desired transmission time of the data packet; perform one or both of pausing and resuming at least a second scheduled transmission corresponding to the at least a second scheduled transmission time to obtain an available time slot at or before the desired transmission time of the data packet; and encode the data packet for transmission during the available time slot using the wireless communication channel.

In Example 16, the subject matter of Examples 13-15 includes subject matter where the instructions further cause the one or more processors to configure a launch time-based priority queue in the MAC layer, the launch time-based priority queue being separate from the plurality of transmission queues.

In Example 17, the subject matter of Example 16 includes subject matter where the instructions further cause the one or more processors to: decode a second MSDU received at the MAC layer of the STA, the second MSDU including a second data packet and second descriptor metadata, and the second descriptor metadata including second launch time information indicating a desired transmission time of the second data packet; and place the second data packet in the launch time-based priority queue based on the second launch time information.

In Example 18, the subject matter of Example 17 includes subject matter where the instructions further cause the one or more processors to: perform one or both of pausing and resuming the at least one of the plurality of transmission queues to obtain an available time slot at or before the desired transmission time of the second data packet; and encode the second data packet for transmission during the available time slot using the wireless communication channel.

In Example 19, the subject matter of Examples 13-18 includes subject matter where the instructions further cause the one or more processors to decode configuration signaling received from an access point (AP), the configuration signaling indicating at least one service period (SP), the at least one SP associated with dedicated channel access to the wireless communication channel by the at least second transmission queue.

In Example 20, the subject matter of Example 19 includes subject matter where the instructions further cause the one or more processors to encode control signaling for transmission to the AP, the control signaling requesting an adjustment of a duration of the at least one SP of the at least second transmission queue based on the desired transmission time of the data packet indicated by the launch time information.

Example 21 is at least one machine-readable medium including instructions that, when executed by processing circuitry, cause the processing circuitry to perform operations to implement any of Examples 1-20

Example 22 is an apparatus comprising means to implement any of Examples 1-20.

Example 23 is a system to implement any of Examples 1-20.

Example 24 is a method to implement any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising:

memory; and processing circuitry coupled to the memory, the processing circuitry is to:

decode a media access control (MAC) service data unit (MSDU) received at a MAC layer of the STA, the MSDU including a data packet and descriptor metadata;

detect a differentiated service code priority (DSCP) tag and launch time information in the descriptor metadata, the launch time information indicating a desired transmission time of the data packet;

place the data packet in a first transmission queue of a plurality of transmission queues of the MAC layer based on the DSCP tag;

determine a scheduled transmission time of at least second transmission queue of the plurality of transmission queues conflicts with the desired transmission time of the data packet;

adjust the scheduled transmission time of the at least second transmission queue based on the launch time information; and encode the data packet for transmission by the desired transmission time using a wireless communication channel.

2. The apparatus of claim 1, wherein to adjust the scheduled transmission time the processing circuitry is to:

pause a scheduled transmission of the at least second transmission queue associated with the scheduled transmission time using an enhanced distributed channel access (EDCA) function of a plurality of EDCA functions corresponding to the plurality of transmission queues.

3. The apparatus of claim 2, wherein the processing circuitry is to:

detect that at least a second scheduled transmission time of the at least second transmission queue conflicts with the desired transmission time of the data packet;

perform one or both of pausing and resuming at least second scheduled transmission corresponding to the at least second scheduled transmission time to obtain an available time slot at or before the desired transmission time of the data packet; and encode the data packet for transmission during the available time slot using the wireless communication channel.

4. The apparatus of claim 1, wherein the processing circuitry is to:

configure a launch time-based priority queue in the MAC layer, the launch time-based priority queue being separate from the plurality of transmission queues.

5. The apparatus of claim 4, wherein the processing circuitry is to:

decode a second MSDU received at the MAC layer of the STA, the second MSDU including a second data packet and second descriptor metadata, and the second descriptor metadata including second launch time information indicating a desired transmission time of the second data packet; and place the second data packet in the launch time-based priority queue based on the second launch time information.

6. The apparatus of claim 5, wherein the processing circuitry is to:

perform one or both of pausing and resuming at least one of the plurality of transmission queues to obtain an available time slot at or before the desired transmission time of the second data packet; and encode the second data packet for transmission during the available time slot using the wireless communication channel.

7. The apparatus of claim 1, wherein the processing circuitry is to:

decode configuration signaling received from an access point (AP), the configuration signaling indicating at least one service period (SP), and the at least one SP associated with dedicated channel access to the wireless communication channel by the at least second transmission queue.

8. The apparatus of claim 7, wherein the processing circuitry is to:

encode control signaling for transmission to the AP, the control signaling requesting an adjustment of a duration of the at least one SP of the at least second transmission queue based on the desired transmission time of the data packet indicated by the launch time information.

9. The apparatus of claim 1, wherein the processing circuitry is to:

decode configuration signaling received from an access point (AP), the configuration signaling indicating at least one service period (SP), the at least one SP associated with dedicated channel access to the wireless communication channel by the first transmission queue of the plurality of transmission queues; and encode control signaling for transmission to the AP, the control signaling requesting an adjustment of a duration of the at least one SP of the first transmission queue based on the desired transmission time of the data packet indicated by the launch time information.

10. The apparatus of claim 1, wherein the plurality of transmission queues comprises a voice (VO) transmission queue, a video (VI) transmission queue, a best effort (BE) transmission queue, and a background (BK) transmission queue.

11. An apparatus of a station (STA), the apparatus comprising:

memory; and processing circuitry coupled to the memory, the processing circuitry is to:

decode a media access control (MAC) service data unit (MSDU) received at a MAC layer of the STA, the MSDU including a data packet and descriptor metadata;

parse the descriptor metadata to obtain launch time information, the launch time information indicating a desired transmission time of the data packet;

determine a plurality of scheduled transmission times associated with a plurality of transmission queues of the MAC layer;

select a scheduled transmission time of the plurality of scheduled transmission times based on the desired transmission time;

place the data packet in a transmission queue of the plurality of transmission queues, the transmission queue associated with the selected scheduled transmission time; and encode the data packet for transmission by the desired transmission time using a wireless communication channel.

12. The apparatus of claim 11, wherein the processing circuitry is to:

select the scheduled transmission time of the plurality of scheduled transmission times based on the scheduled transmission time being lower than the desired transmission time.

13. A non-transitory computer-readable storage medium that stores instructions for execution by one or more processors of an apparatus of a station (STA), the instructions to cause the one or more processors to:

decode a media access control (MAC) service data unit (MSDU) received at a MAC layer of the STA, the MSDU including a data packet and descriptor metadata;

detect a differentiated service code priority (DSCP) tag and launch time information in the descriptor metadata, the launch time information indicating a desired transmission time of the data packet;

place the data packet in a first transmission queue of a plurality of transmission queues of the MAC layer based on the DSCP tag;

determine a scheduled transmission time of at least second transmission queue of the plurality of transmission queues conflicts with the desired transmission time of the data packet;

adjust the scheduled transmission time of the at least second transmission queue based on the launch time information; and encode the data packet for transmission by the desired transmission time using a wireless communication channel.

14. The non-transitory computer-readable storage medium of claim 13, wherein the instructions further cause the one or more processors to:

pause a scheduled transmission of the at least second transmission queue associated with the scheduled transmission time using an enhanced distributed channel access (EDCA) function of a plurality of EDCA functions corresponding to the plurality of transmission queues.

15. The non-transitory computer-readable storage medium of claim 14, wherein the instructions further cause the one or more processors to:

detect that at least a second scheduled transmission time of the at least second transmission queue conflicts with the desired transmission time of the data packet;

perform one or both of pausing and resuming at least second scheduled transmission corresponding to the at least second scheduled transmission time to obtain an available time slot at or before the desired transmission time of the data packet; and encode the data packet for transmission during the available time slot using the wireless communication channel.

16. The non-transitory computer-readable storage medium of claim 13, wherein the instructions further cause the one or more processors to:

configure a launch time-based priority queue in the MAC layer, the launch time-based priority queue being separate from the plurality of transmission queues.

17. The non-transitory computer-readable storage medium of claim 16, wherein the instructions further cause the one or more processors to:

decode a second MSDU received at the MAC layer of the STA, the second MSDU including a second data packet and second descriptor metadata, and the second descriptor metadata including second launch time information indicating a desired transmission time of the second data packet; and place the second data packet in the launch time-based priority queue based on the second launch time information.

18. The non-transitory computer-readable storage medium of claim 17, wherein the instructions further cause the one or more processors to:

perform one or both of pausing and resuming the at least one of the plurality of transmission queues to obtain an available time slot at or before the desired transmission time of the second data packet; and encode the second data packet for transmission during the available time slot using the wireless communication channel.

19. The non-transitory computer-readable storage medium of claim 13, wherein the instructions further cause the one or more processors to:

decode configuration signaling received from an access point (AP), the configuration signaling indicating at least one service period (SP), and the at least one SP associated with dedicated channel access to the wireless communication channel by the at least second transmission queue.

20. The non-transitory computer-readable storage medium of claim 19, wherein the instructions further cause the one or more processors to:

encode control signaling for transmission to the AP, the control signaling requesting an adjustment of a duration of the at least one SP of the at least second transmission queue based on the desired transmission time of the data packet indicated by the launch time information.

* * * * *